Aug. 20, 1957 A. C. DE NAPOLI, JR 2,803,466

MEANS FOR INDEXING RECORDED MATERIAL UPON RECORD MEMBERS IN PHONOGRAPHIC RECORDING MACHINES

Filed Aug. 12, 1950 6 Sheets-Sheet 1

INVENTOR.

ANTHONY C. DENAPOLI, JR.

BY

H. G. Manning

ATTORNEY

Aug. 20, 1957 A. C. DE NAPOLI, JR 2,803,466

MEANS FOR INDEXING RECORDED MATERIAL UPON RECORD MEMBERS IN PHONOGRAPHIC RECORDING MACHINES

Filed Aug. 12, 1950 6 Sheets-Sheet 2

INVENTOR.
ANTHONY C. DENAPOLI, JR.
BY
H. G. Manning
ATTORNEY

Aug. 20, 1957 A. C. DE NAPOLI, JR 2,803,466

MEANS FOR INDEXING RECORDED MATERIAL UPON RECORD MEMBERS
IN PHONOGRAPHIC RECORDING MACHINES

Filed Aug. 12, 1950 6 Sheets-Sheet 3

INVENTOR.
ANTHONY C. DENAPOLI, JR.
BY
H. G. Manning
ATTORNEY

INVENTOR.
ANTHONY C. DENAPOLI, JR.
BY
H. G. Manning
ATTORNEY

INVENTOR.
ANTHONY C. DENAPOLI, JR
BY
H. G. Manning
ATTORNEY

INVENTOR.
ANTHONY C. DENAPOLI, JR.
BY
H. G. Manning
ATTORNEY

United States Patent Office 2,803,466
Patented Aug. 20, 1957

2,803,466

MEANS FOR INDEXING RECORDED MATERIAL UPON RECORD MEMBERS IN PHONOGRAPHIC RECORDING MACHINES

Anthony C. De Napoli, Jr., Windsor, Conn., assignor to The Soundscriber Corporation, New Haven, Conn., a corporation of Connecticut Application August 12, 1950, Serial No. 179,012

11 Claims. (Cl. 274—13)

This invention relates to phonographic recording machines of the type in which a stylus-carrying support or arm is adapted to be driven across a rotating record member at a uniform speed for forming a spiral record groove in said member.

More particularly, the invention relates to a recording machine having an indexing mechanism which is adapted to produce a predetermined acceleration of the stylus-carrying arm whenever desired by the operator, thus permitting the spacing between adjacent turns of the spiral groove to be increased at any desired locations on the record member, and resulting in visible index spaces such as are described in the copending application of Anthony C. De Napoli, Jr. and Donald F. Balmer, entitled "Indicating and Place-Finding Apparatus for Phonographic Machines," Serial Number 158,104, filed April 26, 1950.

One object of this invention is to provide an indexing mechanism whereby the increased speed of the stylus-carrying arm will be accurately controlled by the driving motor of the recording machine without imposing any additional load upon said motor.

Another object is to provide a mechanism of the above nature which may be placed in operation by a single movement of the operator's hand, and which will selectively and accurately produce index spaces of different predetermined widths upon the record member.

Another object is to provide a mechanism of the above nature which will serve to drive the stylus-carrying arm at both normal and increased speeds while avoiding any sudden movement of said arm, whereby the spiral will be broadened and the groove will be continued across the index spaces in unbroken form, thus avoiding any irregularity which would interfere with continuous reproduction of the record.

Another object is to provide a novel power transmitting mechanism whereby a constant speed drive means will be optionally effective either to drive a shaft at a predetermined normal speed or to serve as a governor when said shaft is driven at an increased speed by a second drive means.

Another object of this invention is to provide an improved phonographic dictating machine comprising an indexing mechanism of the above nature, said indexing mechanism being incorporated in the machine in such a manner as to accelerate the recording arm and a driven playback arm in equal amounts, whereby a predetermined relationship between said arms may be maintained when said indexing mechanism is in operation.

A further object is to provide a device of the above nature which will be simple in construction, inexpensive to manufacture, easy to install and manipulate, compact, which will remain in proper adjustment, and which will be very efficient and durable in use.

With these and other objects in view, there has been illustrated on the accompanying drawings, one form in which the invention may conveniently be embodied in practice.

In the drawings,

Fig. 5A is a front view, partly in section, showing the pin-and-slot connection of the overdrive gear upon the stub shaft.

Figure 1:
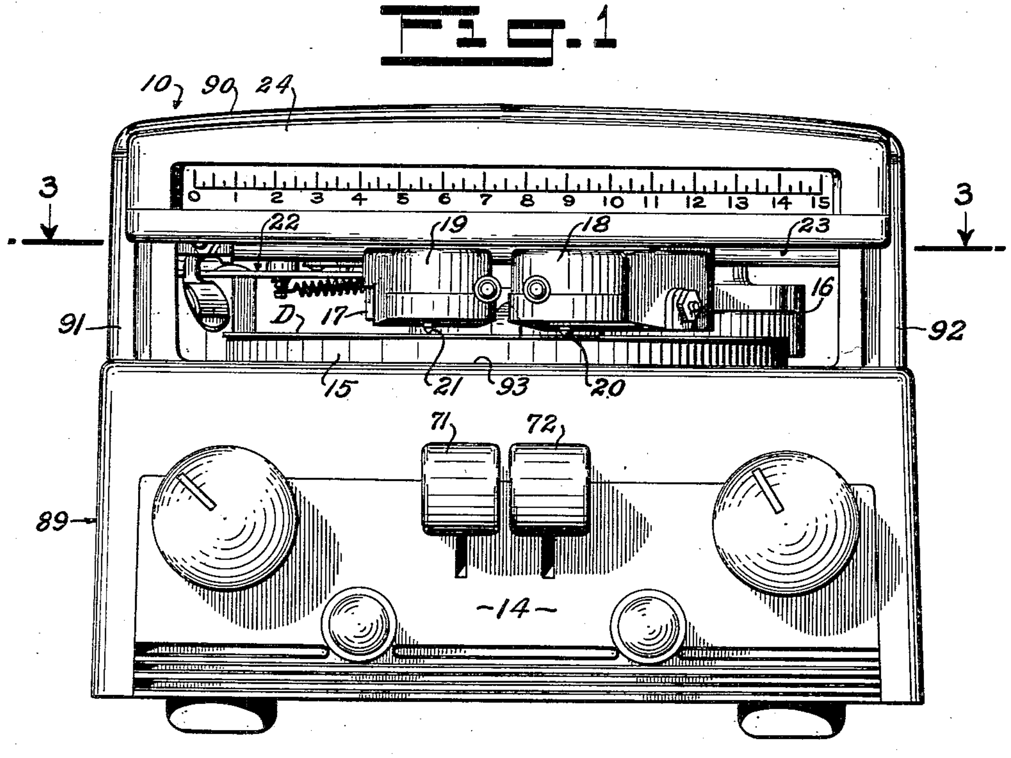
Fig. 1 is a front view of a phonographic dictating machine embodying the improved indexing means.
Figure 2:
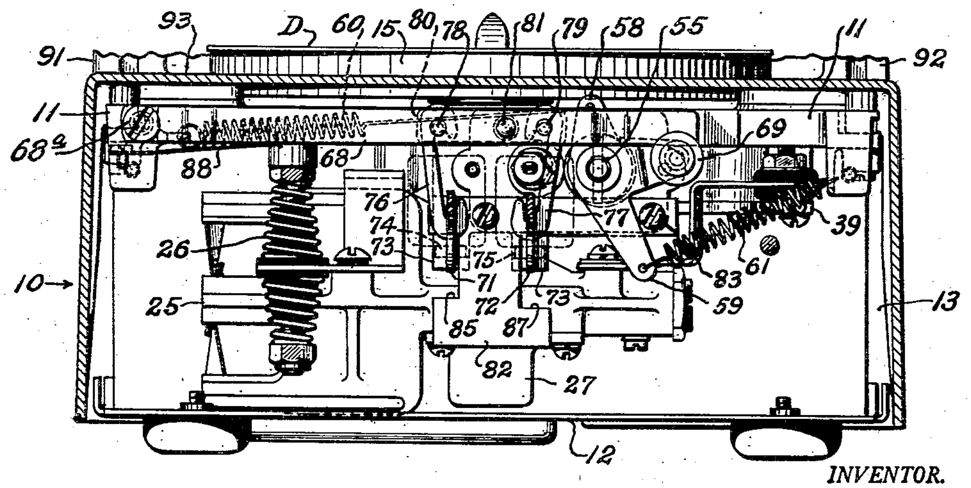
Fig. 2 is a cross-sectional view taken on the line 2—2 of Fig. 3, showing a front interior portion of the machine, including the indexing lever and key assembly.

Referring now to the drawings, in which like reference numerals denote corresponding parts throughout the several views, the numeral 10 indicates a dictating machine which embodies the improved indexing mechanism.

Figure 4:
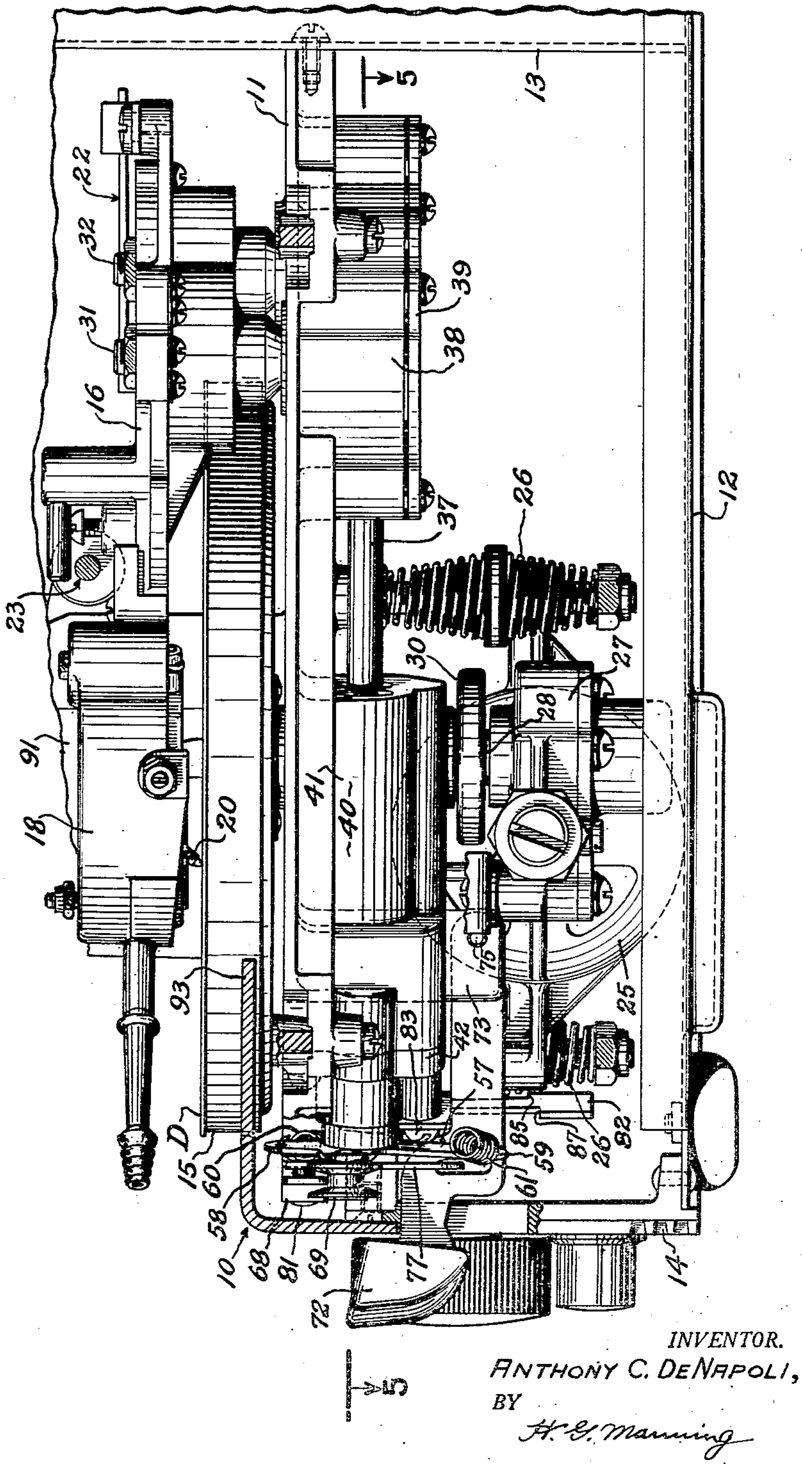
Fig. 4 is a longitudinal sectional view of a portion of the machine taken on the line 4—4 of Fig. 3.

The machine 10 may be of the type which is disclosed in the copending application of Anthony C. De Napoli, Jr. and Frank E. Runge, entitled "Recording and Playback Arm Operating and Setting Means for Dictating Machines," Serial No. 136,222, filed December 31, 1949, and comprises a horizontal motorboard 11 supported above a base plate 12 by a vertical rear panel 13 and a vertical front panel 14 (Fig. 4).

The dictating machine 10 is provided with means for forming and playing back a spiral record groove upon a record disk D when the latter is supported on a rotatable turntable 15 located above a front portion of the motor board 11, said means comprising a recording arm 16 and a playback arm 17.

The recording and playback arms 16 and 17, which comprise respective recording and playback heads 18, 19, having styli 20, 21, are so mounted upon the motor board 11 as to be swingable across the record disk D at opposite sides of the center thereof, as will be further described hereinafter.

The motor board 11 preferably carries a recording and playback arm retracting mechanism 22, including arm lifting means 23, which is adapted to operate in response to vertical swinging movements of a cover 24 overlying the arms 16, 17, as disclosed in the aforesaid application of De Napoli and Runge.

In order to rotate the turntable 15, provision is made of an electric motor 25 which is mounted beneath the motor board 11 by a plurality of suitable resilient mounting means 26. The motor 25 is integrally provided with a speed-reducing gear box 27 for driving a vertical turntable spindle 28 which is journaled in a sleeve bearing 29 (Fig. 5) in the motor board 11, and which carries the turntable 15 above said motor board.

The turntable spindle 28, however, is sectional in form and has a flexible coupling 30 interposed therein, so as to avoid any restraint which would interfere with the resilient mounting of the motor 25.

Figure 3:
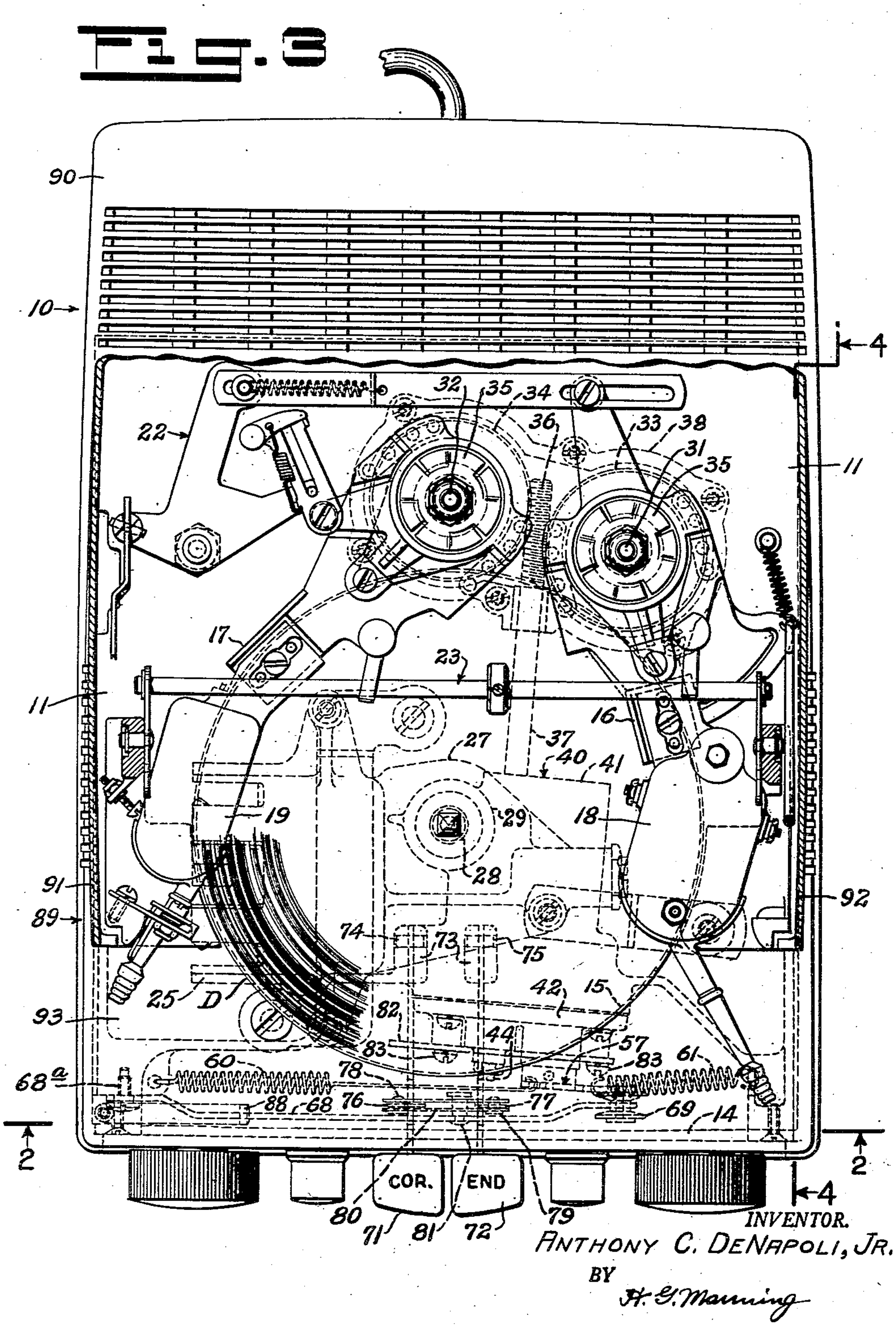
Fig. 3 is a cross-sectional view taken approximately on the line 3—3 of Fig. 1.

In order to drive the recording and playback arms 16, 17 across the record disk D at a carefully regulated speed, said arms are mounted upon respective vertical feed shafts 31, 32 which are journaled in the motor board 11, and which have worm gears 33, 34 fixed thereon below said motor board. The arms 16, 17 are operatively connected to the feed shafts 31, 32 by friction means comprising a pair of pressure springs 35 (Fig. 3) so constructed that the worm gears 33, 34 will normally drive the arms 16, 17 and will also permit said arms to be manually adjusted by the operator independently of the worm gears 33, 34, as in the aforesaid application of De Napoli and Runge.

The worm gears 33, 34 are meshed with opposite sides of a worm 36 which is integrally formed on the rear end of a forwardly extending horizontal drive shaft 37, said worm and said gears being enclosed by a gear casing 38 which is integrally formed upon the lower side of the motor board 11, and provided with a bottom cover 39.

It will be understood that the drive shaft 37 will, when operated at a predetermined constant speed with relation to the turntable spindle 28, cause the recording and playback arms 16, 17 to swing in opposite directions across the record disk D in such a manner that the styli 20, 21 will respectively form and follow a closely pitched spiral record groove in said disk.

If, however, the drive shaft 37 should be operated at an increased speed for a limited time during a recording operation, it will be seen that the pitch of the spiral will be temporarily increased to such an extent as to provide a visible index space between adjacent turns of the record groove.

In order to permit such selective operation of the drive shaft 37 at its normal constant speed or at its increased speed, according to the will of the operator, provision is made of an indexing mechanism which comprises a clutch-and-gear power transmission 40 contained in a casing 41 integrally formed with a bottom front portion of the motor board 11. The transmission casing 41 extends in a horizontal direction which is slightly inclined with respect to the center line of the dictating machine 10, and has a removable cover 42 at its front end. The drive shaft 37 extends longitudinally through the transmission casing 41, respective intermediate and front end portions of said drive shaft being journaled in the rear end of said casing and in the front end cover 42. End thrust resulting from operation of the worm 36 is resisted by the end cover 42 which is provided with a thrust bearing in the form of a ball 43 engaging the front end of the shaft 37 and adjustably held by a screw 44.

The drive shaft 37 is adapted to be operated at normal recording speed by a driving gear 45 on said shaft, said gear being meshed with a worm 46 integrally formed on the turntable spindle 28, and the spindle sleeve bearing 29 being cut away in order to accommodate said driving gear.

It will be noted, however, that the driving gear 45 is not fixed upon the driving shaft 37, but is adapted to operate said shaft in a clockwise direction (as indicated by an arrow in Fig. 5) through the medium of an automatically engageable single acting roller clutch 47 contained within a cylindrical clutch housing 48 integrally formed with the driving gear 45, and adapted to grip a driven clutch member 49 fixed upon the shaft 37. The single acting clutch 47 may, of course, be of any suitable type which will automatically engage so that rotation of the gear 45 will drive the shaft 37 in one direction, while automatically disengaging when said shaft is rotated at a speed greater than the speed of said gear.

In other words, the single acting clutch 47 will always insure that the drive shaft 37 rotates at a speed which is at least equal to the speed of the driving gear 45, but will offer substantially no resistance to the rotation of the shaft 37 at a speed which is greater than the speed of the driving gear 45.

In order to operate the drive shaft 37 temporarily at an increased speed so as to form an index space upon the disk D, provision is made of means which comprises an overdriving clutch 50 contained within a cylindrical housing 51 and adapted to grip a driven member 52 fixed upon the shaft 37 adjacent the driven member 49. The overdriving clutch 50 is an automatically engageable single-acting clutch identical to the driving clutch 47 in all structural respects, and is so arranged that it will not interfere with rotation of the drive shaft 37 by the drive clutch 47, but will automatically engage to pick up said drive shaft for rotation at a speed greater than the speed of said drive clutch 47.

The housing 51 of the overdriving clutch 50 is integrally provided with a pinion 53, which will hereinafter be termed the clutch pinion, and which is adapted to be driven by an overdrive gear 54 in mesh therewith.

The overdrive gear 54 is mounted upon a stub shaft 55 which is journaled in the cover 42 in a position parallel to the drive shaft 37. Further, the overdrive gear 54 is constrained to rotate with the stub shaft 55 by a pin 56 (Figs. 5 and 5A) mounted in said stub shaft and loosely engaged in a slot **56*a* in said gear, so that a small amount of relative lost motion may occur between the gear 54 and the shaft 55**, for reasons to be described hereinafter.

Figure 6:
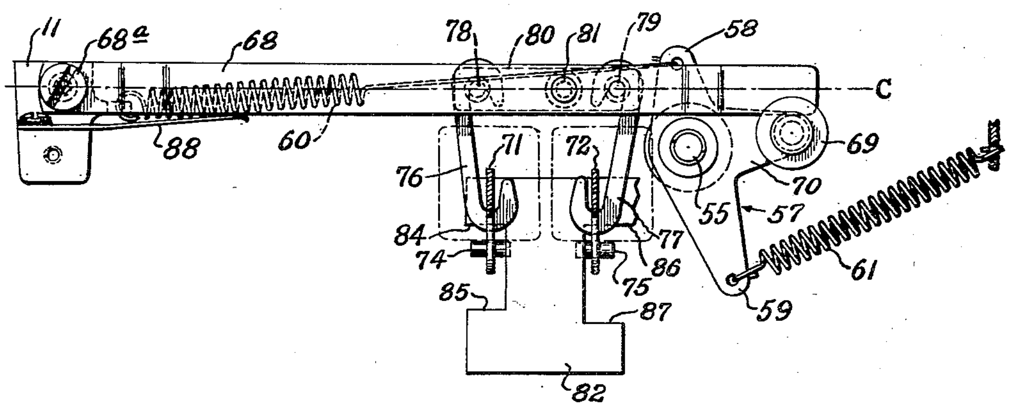
Fig. 6 is a front view, partly in section, showing the indexing lever and key assembly as it would appear when in inactive position.

The stub shaft 55 extends through the cover 42 and has a bell crank lever 57 fixed upon its outer end, said lever comprising upwardly and downwardly extending arms 58, 59, having respective coiled indexing springs 60, 61 attached thereto. The indexing springs 60, 61 are anchored to opposite side portions of the motor board 11 in such a manner as to exert a counter-clockwise rotative force upon the lever 57 and the stub shaft 55, as viewed in Fig. 6, for example.

Thus, it will be seen that the indexing springs 60, 61 may operate under certain conditions to rotate the overdriving clutch housing 51 in a clockwise direction, causing the overdriving clutch 50 to pick up the drive shaft 37 and rotate the latter at a speed greater than the speed of the driving gear 45. Under such circumstances, the driving clutch 47 will, of course, release the drive shaft 37.

Inasmuch as operation of the indexing springs 60, 61 would, if uncontrolled, result in a very sudden and rapid rotation of the drive shaft 37, thus causing the recording stylus 20 to swing suddenly and interrupt the smooth continuity of the record groove, the power transmission 40 is provided with means for governing the action of the indexing springs 60, 61, said means comprising a jack shaft 62 journaled at its rear end in a bearing in the casing 41 and at its front end in an axial bore 63 in the inner portion of the stub shaft 55. The jack shaft 62 has fixed thereon a timing pinion 64 in mesh with the driving gear 45; thus causing the jack shaft 62 to rotate always at a predetermined speed which is constant with relation to the speed of the turntable spindle 28.

The jack shaft 62 will idle when the drive shaft 37 is being driven at normal recording speed by the driving clutch 47. However, when the indexing springs 60, 61 operate so as to rotate the drive shaft 37 at an increased speed, the stub shaft 55 will be automatically coupled to the jack shaft 62 by a timing clutch 65 which is contained within a clutch housing 66 integral with the inner end of the stub shaft 55, and which is adapted to grip an inner clutch member 67 fixed upon the jack shaft 62.

The timing clutch 65 is preferably a single acting roller clutch having the same constructional features as the driving clutch 47 and the overdriving clutch 50.

In short, the power transmission 40 includes a device whereby the drive shaft 37 may be operated at a predetermined normal recording speed by the constant speed turntable spindle 28, and a selectively operable device for operating said drive shaft at an increased indexing speed by the indexing springs 60, 61, the speed of the drive shaft 37 being governed, in the latter case, by the speed of the turntable spindle 28.

The gears and pinions 45, 53, 54 and 64 will be suitably proportioned to operate the drive shaft 37 at the desired speeds. In practice, it has been found satisfactory to form the drive gear 45 with fifty teeth, the clutch pinion 53 with twenty-four teeth, the overdrive gear 54 with fifty teeth, and the timing pinion 64 with twenty-four teeth. Such proportions will result in approximately a 4-to-1 ratio between the indexing and normal recording speeds of the drive shaft 37.

It will be noted at this point that the forces transmitted between the drive gear 45 and the timing pinion 64 will be reversed each time that the drive shaft 37 undergoes a transition from normal recording speed to increased indexing speed. In order to avoid undesirable irregularities in the rotation of the drive shaft 37 which would otherwise result from possible backlash between the gears and pinions during such reversal of forces, and which might also result from any slight delay in the gripping action of the timing clutch 65, the relatively loose engagement of the pin 56 in the overdrive gear slot 56*a* will permit the indexing springs 60, 61 to impart a small rotation to the stub shaft 55 before the overdriving clutch 50 picks up the drive shaft 37 for rotating the latter at increased indexing speed.

In other words, when the indexing springs 60, 61 initiate counter-clockwise rotation of the stub shaft 55, the first effect of such rotation will be to fully engage the timing clutch 65 and to rotate the jack shaft 62 until all backlash is taken up between the elements connecting said jack shaft to the motor 25, after which the pin 56 will engage the side of the slot 56*a* and rotate the overdrive gear 54. The latter will then rotate the pinion 53 and cause the overdrive clutch 50 to operatively engage and rotate the drive shaft 37 at increased indexing speed.

In order to swing the bell crank lever 57 in a clockwise direction against the force of the indexing springs 60, 61, and thus set the indexing mechanism in condition for forming an index space upon the record disk, provision is made of an elongated transverse index lever 68 which is pivoted to a left-hand portion of the motor board 11 by a screw 68*a*.

A right-hand end portion of the index lever 68 engages a grooved roller 69 mounted upon a laterally extending arm 70 of the bell crank lever 57 in such a manner that, when the index lever 68 is depressed, the bell crank 57 will be swung in a clockwise direction.

Figure 8:
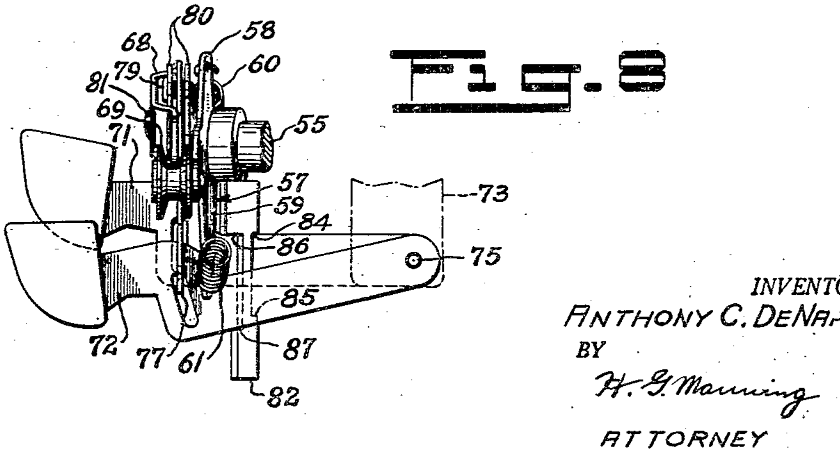
Fig. 8 is a side view of the same as it would appear from the line 8—8 of Fig. 7.

The index lever 68 is adapted to be depressed by either or both of a pair of manually operable keys 71, 72, the rear ends of which are pivoted to a downwardly extending lug 73 on the casing 41 (Figs. 4 and 8) by means of a pair of pivot pins 74, 75, the forward ends of said keys 71, 72 extending outwardly through slots in the front panel 14 so as to be accessible at the front of the machine 10. Intermediate portions of the keys 71, 72 are slotted so as to receive the lower ends of respective hooked links 76, 77, the upper ends of which are engaged over pins 78, 79 at opposite ends of a whiffletree lever 80 eccentrically attached to the index lever 68 by a pivot pin 81.

Figure 5:
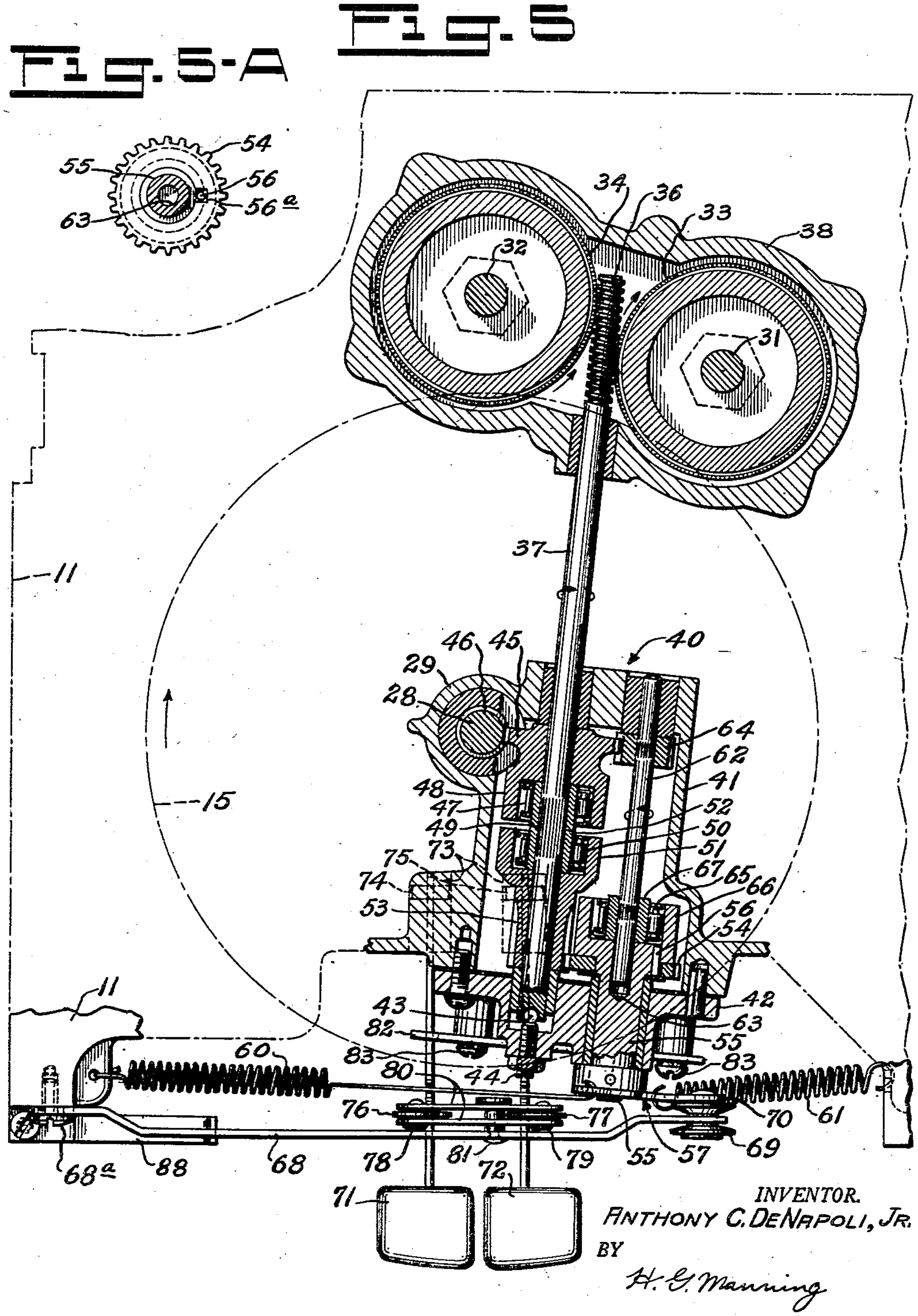
Fig. 5 is a cross-sectional view showing the indexing mechanism as it would appear from the line 5—5 of Fig. 4.

Vertical swinging movements of the keys 71, 72 are limited by an H-shaped key stop member 82 which is attached in a stationary depending position to the front of the transmission cover 42 by means of screws 83 (Fig. 5). The key stop member 82 comprises upper and lower abutments 84, 85 (Fig. 6) for limiting movements of the key 71, and upper and lower abutments 86, 87 for limiting movements of the key 72.

The keys 71, 72 are normally maintained in their uppermost positions (in which they engage the upper abutments 84 and 86) by a leaf spring 88 which is mounted upon a left-hand front portion of the motor board 11, and which presses the index lever 68 upwardly.

In view of the foregoing, it will be seen that either of the keys 71, 72 may be depressed to the extent of the distance allowed by their respective lower stop abutments 85, 87, thus depressing the index lever 68 and swinging the bell crank lever 57 in a clockwise direction.

When either of the keys 71 or 72 is depressed alone, the upper abutment for the other key will, of course, serve to withstand the reacting force at the opposite end of the whiffletree lever 80.

When the depressed key is released by the operator, said key and the index lever 68 will be immediately returned to their uppermost position by the leaf spring 88, while the indexing springs 60, 61 will be allowed to swing the bell crank lever 57 at a controlled rate in a counter-clockwise direction, as hereinbefore described, for producing an index space upon the record disk D.

The action of the indexing springs 60, 61 will be terminated when the grooved roller 69 comes into contact with the index lever 68, the latter being held in a predetermined uppermost position (indicated at C in Figs. 6, 7, 9, and 10) by the engagement of the keys 71, 72 with the upper abutments 84, 86.

Because of the fact that the key stop member 82 is disposed in a plane which is oblique with respect to the keys 71, 72, the lower stop abutments 85, 87 are located at different elevations in order to permit said keys to have equal ranges of vertical angular movement. However, it will be noted that such equal ranges of movement of the keys 71, 72 will be effective to produce different ranges of movement of the index lever 68, inasmuch as the pivot pin 81 of the whiffletree lever 80 is located closer to the pin 79 than to the pin 78.

Figure 7:
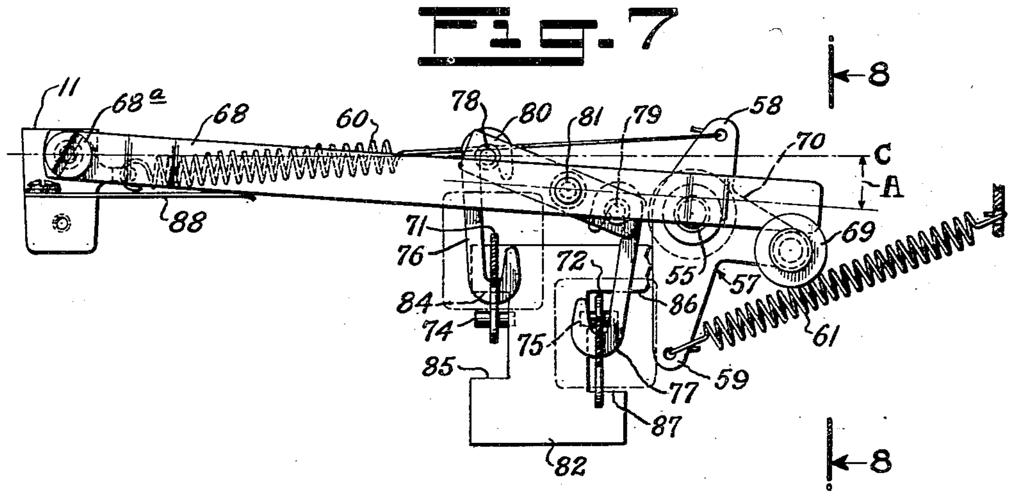
Fig. 7 is a view similar to Fig. 6, but showing the indexing lever and key assembly as it would appear when the righthand or "end-of-letter" key is depressed for providing a relatively wide index space upon the record disk.

The result of this construction is that the operation of the key 72 will depress the index lever 68 to a relatively great extent, as indicated by the letter A in Fig. 7, thus gauging the return movement of the bell crank lever 57 and resulting in an index space of a predetermined width upon the record disk.

Figure 9:
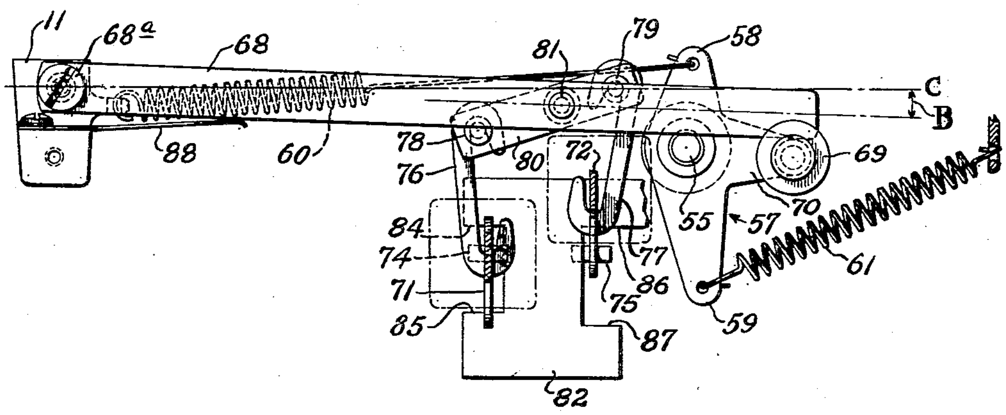
Fig. 9 is a front view similar to Fig. 6, but showing the indexing lever and key assembly as it would appear when the lefthand or "correction" key is depressed for providing a relatively narrow index space upon the record disk.

Operation of the key 71, however, will depress the index lever 68 a relatively small distance, as indicated by the letter B in Fig. 9, so that return movement of the bell crank lever 57 will result in a relatively narrow index space upon the record disk D.

Figure 10:
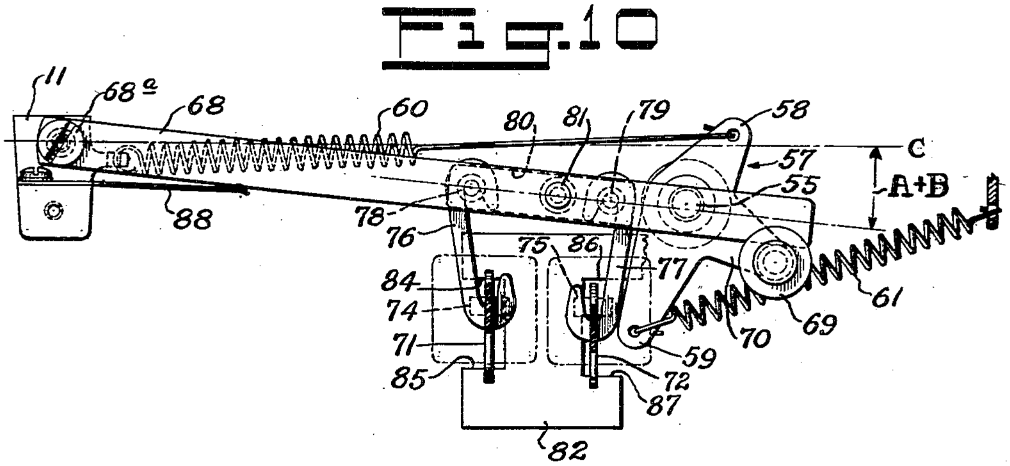
Fig. 10 is a view similar to Fig. 6, but showing the indexing lever and key assembly as it would appear when both keys are depressed for providing an extra wide index space upon the record disk.

Simultaneous operation of both of the keys 71 and 72 will depress the index lever 68 a distance equal to A plus B, as indicated in Fig. 10, and will result in an extra wide index space upon the record disk D.

In order to enclose and conceal the interior of the dictating machine 10, provision is made of an approximately rectangular cabinet 89 which comprises a top wall 90 and side walls 91, 92 located respectively to the rear of, and at opposite sides of, the cover 24.

The cabinet 89 also includes a horizontal shelf 93 which overlies a front portion of the motor board 11 and which embraces a forward portion of the turntable 15 at a level below the swingable cover 24. The shelf 93 is complementary with the front panel 14 in closing the lower front portion of the dictating machine 10.

*Operation*

In use, the dictating machine 10 will be operated in the usual manner for forming a finely pitched spiral record groove in the disk D, and for reproducing the material recorded in said groove.

During a recording operation, when the operator reaches a point to which he wishes to call the attention of a person later playing back the disk, he will merely depress one or both of the keys 71, 72, thus causing the recording stylus 20 to broaden the spiral of the record groove, as said groove is formed by the stylus, and providing the record disk with a visible index space having any one of three different predetermined widths.

The significance of the different widths of index spaces may be prearranged as desired, so that a person later inspecting the disk may correctly interpret the meaning of the index spaces.

Thus, for example, a relatively narrow index space (which will result from operation of the key 71) may indicate to a typist transcribing the record the location of a correction which must be made in the material which was recorded in the record groove immediately preceding said index space. A wider index space (which will result from operation of the key 72) may indicate the end of a letter, and a still wider space (which will result from simultaneous operation of both keys 71, 72) may be assigned some other meaning, as for example the recordation of an urgent matter such as a telegram or special instructions which must receive immediate attention.

It will thus be seen that when the index keys are operated, the pitch of the spiral groove will be smoothly and gradually broadened in such a manner as to avoid any sudden breaks, jogs, or irregularities in said groove, so that a playback stylus may follow the record groove continuously across the index spaces during a subsequent reproducing operation.

One advantage which is provided by this mode of operation is that the record groove may be recorded continuously across the index spaces, so that the record may be reproduced without any interruption by the index spaces.

Another advantage is that the record disk D cannot be injured by operation of the indexing mechanism while the turntable is at rest, since said mechanism can swing the arm 16 and the recording stylus 20 thereon only during rotation of the turntable. If desired, provision may be made of a switch for closing the motor circuit when either of the keys 71, 72 is depressed, so that an index space will be formed immediately even though the turntable may have been at rest when the key was depressed. Such a switch may be so connected that the circuit of the driving motor 25 will be held closed whenever the bell crank lever 57 is not in its normal inactive position.

If, at any time, the operator should start to dictate before operation of the indexing mechanism has been completed, no adverse effect will result inasmuch as the broadened spiral portion of the record groove, which extends across the index space, may be recorded and reproduced in the same manner as the normally recorded portions of the disk.

In view of the fact that the recording arm 16 and the playback arm 17 are both adapted to be driven by the single drive shaft 37, a predetermined relationship between said arms 16 and 17 may be maintained at all times, if desired by the operator, and operation of the indexing mechanism will not disturb such relationship. In order to permit the playback stylus 21 to follow the record groove continuously during operation of the indexing mechanism, even though said playback stylus may not be engaged with the same turn of the groove with which the recording stylus 20 is engaged, the playback stylus 21 is preferably mounted in the playback head 19 in such a manner as to have a substantial lateral compliance.

It will be understood, however, that the improved indexing mechanism may be used to advantage in a dictating machine which lacks any playback arm, or in which the playback arm is freely swingable and has no means for feeding it in a lateral direction across the turntable.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a phonographic dictation recording machine, a support for a record member, a motor, means driven by said motor for rotating said support and record member, a stylus carrying arm for forming a sound groove in said record member, mechanism for feeding said arm laterally across said record at normal recording speed comprising a driving shaft detachably connected to said record rotating means, a manually windable spring driven over-drive means for driving said shaft for a predetermined period at an increased indexing speed, and simultaneously disconnecting said arm feeding means from said record rotating means and means operatively connecting said record rotating means and said over-drive means for governing said indexing speed.

2. The invention as defined in claim 1, in which said mechanism comprises a feed shaft for swinging said arm across said record member, a single action automatically engageable clutch adapted to operate said feed shaft at normal recording speed, and said over-drive device including a single acting automatically engaging clutch adapted to pick up said feed shaft for operation at said indexing speed, said first clutch being disengaged from said shaft when its speed exceeds normal.

3. In a phonographic recording machine having a disk record turntable, a motor for operating said turntable, a stylus carrying recording arm, mechanism operatively connected with said motor for feeding said recording arm at a predetermined normal speed across said turntable, an over-drive device for feeding said recording arm at an increased indexing speed for a predetermined short period of time across said turntable, means for causing said motor to become disengaged from said feeding means when said arm is rotated at said greater indexing speed, said over-drive device being energized by a manually wound spring which is independent from said motor, and means controlled by the speed of said motor for governing said indexing speed.

4. In a phonographic dictation recording machine, a motor driven disk record supporting turntable, a stylus carrying arm swingable laterally across said record for forming a continuous sound groove therein, a feed shaft connected to said motor for driving said arm at a predetermined normal rate of speed across said record, a transverse indexing lever pivoted at one end to one side of said machine, a whiffletree lever eccentrically pivoted at an intermediate position on said indexing lever, a pair of hooked links connecting the outer ends of said whiffletree lever to a pair of longitudinally key-operated levers pivoted to the front of said machine and resting in the bottoms of said links, a spring-pressed bell crank lever cooperatively connected to the other end of said indexing lever, an over-drive mechanism for said feed shaft for increasing the speed of said arm to produce an indicating space on said record, said over-drive mechanism normally being in inoperative condition, said over-drive mechanism being controlled by said bell crank lever, said key-operated levers being selectively depressible to produce varying degrees of operation of said bell crank lever whereby varying areas of increased pitch are effected on said record and a stop plate embracing said key operated levers to limit their range of movements.

5. In a phonographic dictating machine, a motor driven record supporting turntable, a stylus carrying arm having means for connecting it to said motor for swinging it laterally across said record to produce a spiral groove at normal recording speed; means for increasing the pitch of said groove, comprising an overdrive device, a manually windable spring for operating said overdrive device, a single acting clutch for connecting said overdrive device with said arm swinging means, said clutch being driven by the unwinding force of said spring, a transverse index lever for energizing said spring, a whiffletree lever eccentrically mounted on said index lever, a pair of manually depressible keys movable through different predetermined ranges for operating said index lever, said keys being connected to the outer ends of said whiffletree lever, the depression of said individual keys producing increased pitch index areas of different widths, and the simultaneous depression of both keys producing an index space of a width equal to the sum of the widths produced by said individual keys.

6. In a phonographic dictating machine, a motor driven record supporting turntable, a stylus carrying arm, a feed shaft detachably connecting said motor and said arm for swinging the latter laterally with respect to said rotating record member at normal recording speed for producing a spiral groove on said record, means for disengaging said feed shaft from said motor drive means when the speed of said shaft exceeds the normal rate, said disengaging means comprising an over-drive means surrounding said feed shaft and automatically engageable therewith selectively to rotate said feed shaft at an increased indexing speed, a manually-wound spring for operating said overdrive means, an index lever pivoted to said machine at one end of said lever and cooperatively connected with said over-drive means at its other end, and manually depressible key-operated levers at the front of said machine having different ranges of movement for selectively operating said index lever and said over-drive means.

7. The invention as defined in claim 6 wherein said over-drive means comprises a pair of clutches and in which provision is made of means connected to said motor and to said clutches for governing the speed of operation of said over-drive means.

8. The invention defined in claim 7 in which said over-drive means is provided with a lost motion connection adapted to delay the engagement thereof until the backlash existing in said governing means has been taken up, thus avoiding irregularities in the sound track.

9. In a phonographic recording machine, a motor-driven turntable supporting a rotating disk record, a laterally movable stylus carrying arm, a drive shaft driven by said motor to move said arm across said record, clutch means connected to said shaft for causing said stylus carrying arm to swing at normal speed across said record, means for disengaging said clutch from said shaft when its speed exceeds a normal rate, an overdrive clutch engageable with said shaft to rotate it at increased speed for producing an indicating area of increased pitch on said record, means for manually energizing a spring for operating said overdrive clutch to drive said shaft at said increased speed, said spring being connected to said shaft by a timing clutch, said timing clutch being detachably connected to a jack shaft parallel to said shaft and geared to said first mentioned clutch means for governing the rate of said overdrive speed.

10. The invention as defined in claim 4, in which said stop plate is located at an oblique angle with respect to th front of the casing of said machine whereby the throws of said key operated levers will be different from each other.

11. In a phonographic dictation recording machine, a motor driven rotatable sound record, a stylus carrying sound recording arm movable over said record, a drive shaft driven from said motor for swinging said arm laterally across said record, a pair of opposed single acting clutches selectively engageable with said shaft, means for causing one of said clutches to engage said shaft and swing said arm at normal recording speed, a second power means for causing the other of said clutches to engage said shaft and swing said arm at a greater indexing speed, said second power means comprising a stub shaft spaced from said drive shaft, a third clutch connected to said stub shaft, gear mechanism interconnecting said stub shaft with said first clutch, means to cause said first clutch to become disengaged from said shaft automatically when the speed of the latter becomes greater than normal, and means connected to said motor driving means for governing the greater speed of operation of said second power means.

References Cited in the file of this patent

UNITED STATES PATENTS

| | | |
|---|---|---|
| 1,077,973 | Catucci | Nov. 11, 1913 |
| 2,262,732 | Gruber | Nov. 11, 1941 |
| 2,350,490 | Berliner | June 6, 1944 |
| 2,446,526 | Chanal | Aug. 10, 1948 |
| 2,611,620 | Runge | Sept. 23, 1952 |